United States Patent Office 3,329,579
Patented July 4, 1967

3,329,579
METHOD OF PREPARING 16-OXYGENATED DERIVATIVES OF ESTR-4-EN-3-ONE
Karl Jolivette Sax, West Nyack, and Robert Henry Blank and Chester Eric Holmlund, Pearl River, N.Y., and Ralph Henry Evans, Jr., River Vale, N.J., assignors to American Cyanamid Company, Stamford, Conn., a corporation of Maine
No Drawing. Original application Jan. 24, 1964, Ser. No. 339,851, now Patent No. 3,226,404, dated Dec. 28, 1965. Divided and this application Oct. 5, 1965, Ser. No. 493,261
4 Claims. (Cl. 195—51)

ABSTRACT OF THE DISCLOSURE

Preparation of 16β-hydroxy-estr-4-en-3-one and estr-4-ene-3,16-dione by contacting *Cephalosporium acremonium* with estr-4-en-3-one under fermentation conditions, and the preparation of 16-hydroxy or 16-ketoestr-4-en-3-one by contacting a growing culture of *Bacillus megaterium* with estr-4-en-3-one. The compounds are useful as hypocholestermic agents and in some instances, for their anabolic activity.

---

This application is a division of application Ser. No. 339,851, filed Jan. 24, 1964, now U.S. Patent 3,226,404.

The novel process of the present invention is essentially a microbiological oxidation of steroid substrates to produce the 16-oxygenated derivatives. The type of oxygenated steroid depends on the organism selected and the particular fermentation conditions.

The starting material may be for example, 3-methoxy-estra-1,3,5(10)-triene which is chemically converted to 3-methoxyestra-2,5(10)-diene by treatment with lithium and liquid ammonia. The 3-methoxyestra-2,5(10)-diene on treatment with hydrochloric acid produces estr-4-en-3-one, the substrate used in the fermentations described hereinafter to produce the 16-oxygenated estr-4-en-3-ones.

In carrying out the process of the present invention, the suitable organism is cultivated aerobically in a suitable nutrient medium with the steroid which is to be hydroxylated. During the growth of the organism under favorable conditions, the desired hydroxyl group is introduced into the steroid ring structure. The exact mechanism by which this hydroxylation is accomplished is not wholly certain. It is known to be caused by enzymes produced by the organism in the process of growth.

In accordance with the present invention, suitable organisms of the genus Bacillus such as *Bacillus megaterium*, or of the genus Cephalosporium such as *Cephalosporium acremonium* have the unexpected property of producing the desired result. These organisms are on deposit at culture depositories such as Northern Regional Research Laboratories, Peoria, Ill. and as described hereinafter.

A suitable nutrient medium contains a soluble source of carbon, nitrogen and mineral elements. In general, preparation of such media is well known and the practice of the present invention in this respect may follow such procedures. An illustrative example of a suitable medium of this type is one which contains the following: 2% Edamin, 2% glucose, 0.5% cornsteep liquor; the whole being adjusted to about pH 7 with 10-normal sodium hydroxide. This medium is used in the illustrative examples below.

In an illustrative preparation of inoculum, about one ml. of cell suspension as washed with about six ml. of aqueous sterile salt solution (0.9%) from a suitable culture, as on potato dextrose agar, yeast extract agar or the like, is used to inoculate about 100 ml. of sterile medium in a 500 ml. Erlenmeyer flask. Inoculated medium then is incubated at about 25°–37° C., usually averaging about 28° C., on a shaker for an initial pregrowth period of some 4 to 24 hours. Thereafter the steroid is added, usually about 10 mg. in about 1 ml. of methanol, and incubation is continued until harvest, usually some 24–144 hours after adding the steroid. This procedure is used below in the illustrative examples.

A number of alternatives for the several steps may be used, for example, use of a pregrown vegetative inoculum instead of the washed slant suspension. Other media, media volumes, incubation periods, and temperatures may be used. Instead of adding the steriod to the inocula the latter may be used to inoculate other flasks for steroid conversion or larger batches of medium in seed bottles. Such bottle cultures, after further incubation, usually under conditions of aeration and stirring may be used for steroid conversion or to inoculate large batches of medium in aerated, stirred fermentation tanks.

A good typical practice in fermentation tank procedure is illustrated in the following method. Medium is prepared in the tank, sterilized by heating and cooled to the temperature of the inoculant. The medium is then inoculated with from about one to about six percent of a vegetative inoculum prepared as above. The broth is then agitated with a stirrer at from about 100 to about 500 r.p.m., and aerated at the rate of about 0.5 to about 1.5 volumes of air per volume of broth per minute. The actual values used will vary within the approximate ranges shown, depending upon the volume, the shape of the tank, the stirrer and the like.

The inoculated tank is then maintained at the desired temperature, in the illustrative case about 27° C., for from 6 to 70 hours. The steroid substrate is then added, usually dissolved in methanol. Agitation and aeration are continued until the substrate has been substantially converted to the desired products. The culture broth is then harvested and the hydroxylated product isolated.

The amount of steroid added as substrate to the fermentation may be varied as necessary or desirable. However, a good practice will ordinarily be to add on the order of about 0.05 to about 1.0 gram per liter of nutrient medium.

When using such steroid substrates in the fermentation, the products formed are the free steroids. The steroid substrates are generally added to the fermentation in solution or in finely-divided form. A preferred method is to dissolve the steroid in methanol or some other water-miscible solvent and to add it to the fermentation medium at the desired stage in the process. Although the steroid may precipitate from solution when so added, it is dispersed throughout the medium as a fine suspension and becomes readily available to the organism for oxidation.

During fermentation, it is frequently found desirable to add an antifoaming agent. In such cases, commercially-available products may be used. These usually contain such agents as silicones, glyceride oils, and the like.

The compounds of this invention are useful as intermediates for the microbial dehydrogenation process which yields 16-oxygenated 17-desoxoestrones, which are useful as hypocholesteremic agents. An additional utility of the invention is illustrated by compounds of this invention, such as 16β-hydroxyestr-4-en-3-one which demonstrates a highly desirable ratio of anabolic to androgenic activity. That is to say, while the compound has a high anabolic activity, at the same time it shows low androgenic activity.

The invention broadly described will be further illustrated in greater detail by the following specific examples. Preparation of the initial fermentation substrate, estr-4-en-3-one, is described in Examples 1 and 2. It should be understood however, that although these examples may

EXAMPLE 1

*Preparation of 3-methoxyestra-2,5(10)-diene*

A partial solution of 7.5 g. of 3-methoxyestra-1,3,5(10)-triene in 20 ml. of etthanol, 100 ml. of anhydrous ethyl ether, and 500 ml. of liquid ammonia is stirred and 7.0 g. of lithium, cut into small pieces, is added during two hours. Additional liquid ammonia is added as necessary to maintain the volume. The reaction is continued until an 0.2 ml. aliquot diluted to 10 ml. with ethanol no longer shows appreciable ultra violet absorption at 280 m$\mu$. The reaction mixture is warmed to evaporate the ammonia, and the excess lithium is destroyed by the careful addition of ethanol and water. After dilution with water the mixture is extracted several times with ether and the combined ether extract is washed with water, dried over magnesium sulfate, and filtered. Concentration of the filtrate and fractional crystallization of the product from ether yields 4.82 g. of 3-methoxyestra-2,5(10)-diene, melting point 91–93°, $[\alpha]_D^{25}$ +69° (chloroform). Additional product may be isolated from the mother liquors.

EXAMPLE 2

*Preparation of estr-4-en-3-one*

A suspension of 5.72 g. of 3-methoxyestra-2,5(10)-diene in 48 ml. of methanol and 2 ml. of concentrated hydrochloric acid is warmed gently on a steam bath until solution is complete (about 5 minutes). The reaction mixture is allowed to stand for 10 minutes, and is then treated with 5 ml. of 5 N sodium hydroxide solution and a little water. After cooling in a mixture of solid carbon dioxide with methanol the solution deposits 4.2 g. of crystalline estr-4-en-3-one, melting point 63.4°–65° C. Recrystallization of this material yields pure estr-4-en-3-one, melting point 65.5°–66.75° C., $\lambda_{\text{max.}}^{\text{CH}_3\text{OH}}$ 240 m$\mu$, $\epsilon$16,000, $[\alpha]_D^{25}$+44 (chloroform), $[\alpha]_D^{25}$ +24 (methanol)

EXAMPLE 3

*Preparation of 16β-hydroxyestr-4-en-3-one*

An inoculum containing *Bacillus megaterium* (NRRL–B938) is added under sterile conditions to a fermentor containing a sterile growth medium consisting of 1500 g. of glucose, 600 g. of Edamin, and 150 g. of cornsteep liquor in sufficient water to make 30 liters and adjusted to pH 6.5 with sodium hydroxide. The fermentation mixture is stirred and aerated at 28° C. during 48 hours, at which time a solution of 3.0 g. of estr-4-en-3-one in methanol is added. Six and one half hours after the addition of steroid the fermentation mixture is adjusted to pH 6.5 with hydrochloric acid, and extracted with an equal volume of chloroform. The chloroform layer is separated and the aqueous layer is twice extracted with half its volume of chloroform.

The combined chloroform extract is concentrated under reduced pressure to 4 liters, dried over magnesium sulfate, and after stirring for several minutes with 5 g. of decolorizing carbon, is filtered. Concentration of the chloroform yields an oily residue, which is dissolved in 200 ml. of 75:25 (volume) methylene chloride-hexane mixture. Adsorption chromatography on a 300 g. silica gel column is accomplished by elution with 1800 ml. of the above solvent followed by 8 liters of 2% acetone-98% methylene chloride and 3 liters of 10% acetone in methylene chloride. The steroid obtained by evaporation of solvent from the 3800–6800 ml. portion of the eluate is crystallized from acetone-hexane to yield 500 mg. of 16β-hydroxyestr-4-en-3-one, melting point 149°–150° C., $[\alpha]_D^{25}$ +22.8 (c.=1.05 in CH$_3$OH), $\lambda_{\text{max.}}^{\text{CH}_3\text{OH}}$ 239 m$\mu$, $\epsilon$17,350

EXAMPLE 4

*Preparation of estr-4-en-3,16-dione, 16α-hydroxyestr-4-en-3-one and 16β-hydroxyestr-4-en-3-one*

An inoculum containing *Bacillus megaterium* (NRRL–B938) is added under sterile conditions to a fermentation tank containing 400 g. of Edamin, 400 g. of glucose, and 144 g. of cornsteep liquor in sufficient water to make 20 liters. The fermentor contents are stirred and aerated at 28° C. for 23 hours. Two grams of estr-4-en-3-one is added in methanol solution, and, after 70 hours of fermentation the contents of the fermentor are removed and extracted with an equal volume of chloroform after acidification to pH 6.5 with hydrochloric acid. The chloroform layer is separated and the aqueous layer is twice extracted with half volumes of chloroform.

Evaporation of the chloroform from the combined extracts leaves 133 g. of a viscous oil, which is fractionated by adsorption chromatography on a column composed of 600 g. of silica gel. The column is developed with 50% methylene chloride–50% hexane (1.2 liters), 60% methylene chloride–40% hexane (2 liters), 80% methylene chloride–20% hexane (2 liters), methylene chloride (7 liters), 5% ether–95% methylene chloride (1 liter), 10% ether–90% methylene chloride (1 liter), 50% ether–50% methylene chloride (4 liters) and ether (5 liters).

Partition chromatography of the residue obtained on evaporation of solvent from the 80% methylene chloride-hexane and the first part of the methylene chloride eluate is done on a 400 g. column of diatomaceous earth moistened with 200 ml. of the lower phase of a solvent system composed of water, methanol, dioxane and cyclohexane in the volume ratio 2:4:1:10. Elution of the column with 1 liter of the upper phase of the above system and two liters of the upper phase of a similar system whose proportions are 2:6:1:10 provides a fraction between 1035 and 1895 ml. of eluate, which yields, on concentration and crystallization of the residue from aqueous methanol, 700 mg. of estr-4-ene-3,16-dione, melting point 139.5°–140.5° C. Additional less pure material is found in the mother liquors.

The next portion of the methylene chloride eluate from the adsorption column is concentrated, and the residue is chromatographed on a partition column of 75 g. of diatomaceous earth moistened with 37.5 ml. of the lower phase of a solvent system composed of water, methanol, dioxane, and cyclohexane in the volume ratio 1:1:1:5. Elution of the column with the upper phase of the solvent system shows concentrations of steroids at 90–165 ml. and 215–330 ml. of eluate. Concentration of the first fraction and crystallization of the residue from aqueous methanol yields 70 mg. of estr-4-ene-3,16-dione. Similar work up of the second fraction provides 13 mg. of 16β-hydroxyestr-4-en-3-one, melting point 146°–147.5° C.

The first 1270 ml. of the 50% ether–50% methylene chloride eluate from the adsorption column is concentrated to a residue which is further purified by partition chromatography on a column of 300 g. of diatomaceous earth moistened with 150 ml. of the lower phase of a solvent system composed of water, methanol, dioxane, and cyclohexane in the volume ratio 1:1:2:5. Elution with the upper phase of this system yields the major component between 825 and 1265 ml. Crystallization from ethyl acetate-hexane of the residue obtained on concentration of this fraction provides 157 mg. of 16α-hydroxyestr-4-en-3-one, melting point 163°–164° C., $\lambda_{\text{max.}}^{\text{CH}_3\text{OH}}$ 240 m$\mu$, $[\alpha]_D^{25}$ +21° (CH$_3$OH)

EXAMPLE 5

*Preparation of estr-4-ene-3,16-dione and 16β-hydroxyestr-4-en-3-one*

An agar slant supporting an active growth of *Cephalosporium acremonium* (NRRL No. 3092; Lederle culture Z918) is scraped under sterile distilled water, and the suspension is used to inoculate 100 ml. of medium (consisting of 2% Edamin, 2% glucose and 0.5% cornsteep liquor) in a 500 ml. Erlenmeyer flask. The flask is shaken on a rotary shaker at 28° C. for 64 hours and its contents are used to inoculate three 750 ml. portions of the same medium in 4 liter Erlenmeyer flasks. The culture is shaken for 64 hours at 28° C., and a solution of 500 mg. of estr-4-en-3-one in a small amount of methanol is divided equally among the three fermentation flasks. After shaking at 28° C. for 51 hours, the fermentations are combined and the pH is reduced from 6.9 to 2.5 with 5 N hydrochloric acid.

The fermentation mixture is extracted twice with an equal volume of methylene chloride. After filtration the filtrate is again extracted with methylene chloride, and the combined extract is concentrated to 8.5 g. of an oily residue. Partition chromatography of the residue on a 150 g. column of diatomaceous earth moistened with 75 ml. of the lower phase of a solvent system composed of water, methanol, dioxane, and cyclohexane (volume ratio 2:4:1:10) separates two steroid products. One is estr-4-en-3,16-dione, identified by mixture melting point with a known sample and by infrared absorption spectrum. The other is 16β-hydroxyestr-4-en-3-one, melting point 146.5°–148.5° C.

EXAMPLE 6

*Preparation of 3-hydroxyestra-1,3,5(10)-trien-16-one*

Three 500 ml. Erlenmeyer flasks, each containing 100 ml. of medium #13 consisting of cerelose 10 g., yeast extract, 1 g., 2.5 g. sodium chloride, 4 g. beef extract, 4 g. peptone, and 1000 ml. of water, inoculated with the growth of *Nocardia corallina* (ATCC 999) from yeast extract agar slant, are shaken for 6 hours at 37° C. on a reciprocating shaker. The contents of these flasks are used to inoculate three 750 ml. portions of fresh medium #13 contained in three 4 liter Erlenmeyer flasks. After incubation of this mixture on a reciprocating shaker at 24° C. for 16 hours, 165 mg. of estr-4-ene-3,16-dione is added to each flask under sterile conditions, and the fermentation is continued for 24 hours.

The combined fermentation mixture is stirred with an equal volume of methylene chloride. After settling, the methylene chloride layer is separated, and the aqueous layer is reextracted with two half volumes of methylene chloride. Evaporation of the methylene chloride from the combined extracts provides an oily residue which is purified by partition chromatography on a column composed of 200 g. of diatomaceous earth moistened with 100 ml. of the lower layer of a solvent system composed of water, methanol, dioxane, and cyclohexane in the volume ratios 2:4:1:10. Elution of the column with the upper phase of the above solvent system (900 ml.) and the upper phases of systems containing the same solvents in the volume ratios 2:2:1:10 (900 ml.) and 2:2:2:10 (1000 ml.) separates the steroid from its accompanying impurities so that crystallization of the residue obtained on evaporation of solvent from the eluate provides a 67% yield of 3-hydroxyestra-1,3,5(10)-trien-16-one, melting point 245°–246.5° C.

EXAMPLE 7

*Preparation of 16β-acetoxyestr-4-en-3-one*

A solution of 75 mg. of 16β-hydroxyestr-4-en-3-one in 2 ml. of pyridine and 0.5 ml. of acetic anhydride is heated on a steam bath for one hour. The hot mixture is poured into cold, dilute hydrochloric acid, and the steroid is extracted with ether. After washing with dilute hydrochloric acid, water, and sodium bicarbonate solution, the ether extract is dried over magnesium sulfate, filtered, and concentrated to a residue, which affords 75 mg. of 16β-acetoxyestr-4-en-3-one, melting point 87.5°–89.5° C. on crystallization from aqueous methanol. This product yields 35 mg. of 16β-acetoxyestr-4-en-3-one, melting point 90°–90.5° C., $[\alpha]_D^{25}$ +21.5°,

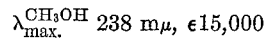
$\lambda_{max.}^{CH_3OH}$ 238 m$\mu$, $\epsilon$15,000 after two recrystallizations from aqueous acetone. Additional product is available in the mother liquors.

EXAMPLE 8

*Preparation of 16α-acetoxyestr-4-en-3-one*

A solution of 100 mg. of 16α-hydroxyestr-4-en-3-one in 5 ml. of pyridine and 1 ml. of acetic anhydride is allowed to stand overnight at room temperature. The reaction mixture is poured into water, and the aqueous mixture is extracted with methylene chloride. The methylene chloride extract is washed with water, dried over magnesium sulfate, filtered, and the methylene chloride is evaporated. The residue is chromatographed on a column composed of 50 g. of diatomaceous earth moistened with 25 ml. of the lower phase of an ethylene glycol monomethyl ether-heptane (1:1) system. Elution of the column with the upper phase of the above solvent system affords the 16α-acetoxyestr-4-en-3-one at about 2.6 column retention volumes. The acetate, a noncrystalline oil with no optical rotation (±4°),

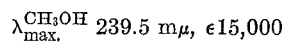
$\lambda_{max.}^{CH_3OH}$ 239.5 m$\mu$, $\epsilon$15,000 is isolated from the eluate by evaporation of the solvent under reduced pressure.

We claim:

1. The method of preparing 16β-hydroxyestr-4-en-3-one which comprises contacting *Cephalosporium acremonium* in a fermentation media with estr-4-en-3-one and recovering the compound therefrom.

2. The method of preparing estr-4-ene-3,16-dione which comprises contacting *Cephalosporium acremonium* with estr-4-en-3-one under fermentation conditions separating the product resulting and recovering the compound therefrom.

3. A method of preparing a member of the group consisting of 16-hydroxy estr-4-en-3-one and 16-ketoestr-4-en-3-one which comprises fermenting estr-4-en-3-one with a growing culture of *Bacillus megaterium* and recovering the compounds therefrom.

4. The method of preparing 16β-hydroxyestr-4-en-3-one which comprises fermenting estr-4-en-3-one with a growing culture of *Bacillus megaterium* and recovering the compound therefrom.

References Cited

UNITED STATES PATENTS 3,188,325   6/1965   Amici et al. _____ 195—51 X

A. LOUIS MONACELL, *Primary Examiner.*

ALVIN E. TANENHOLTZ, *Examiner.*